United States Patent [19]
Krallmann et al.

[11] Patent Number: 5,632,783
[45] Date of Patent: May 27, 1997

[54] MIXTURES OF REACTIVE DYES FOR NAVY SHADES

[75] Inventors: Reinhold Krallmann, Weisenheim; Manfred Sülflow, Bad Dürkheim, both of Germany

[73] Assignee: BASF Aktiengesellschaft, Ludwigshafen, Germany

[21] Appl. No.: 608,175

[22] Filed: Feb. 28, 1996

[30] Foreign Application Priority Data

Mar. 3, 1995 [DE] Germany .................. 195 07 461.0

[51] Int. Cl.$^6$ .................. D06P 1/10; D06P 1/384; D06P 3/10; D06P 3/66
[52] U.S. Cl. .................. 8/549; 8/641; 8/681; 8/685; 8/687
[58] Field of Search .................. 8/549, 641, 681, 8/685–687

[56] References Cited

U.S. PATENT DOCUMENTS

| 4,705,524 | 11/1987 | Hähnke et al. ............... 8/527 |
| 5,446,193 | 8/1995 | Marschner et al. . |
| 5,456,728 | 10/1995 | Schwartz et al. ............. 8/549 |

FOREIGN PATENT DOCUMENTS

| 0 224 224 | 6/1987 | European Pat. Off. . |
| 0 592 980 | 4/1994 | European Pat. Off. . |
| 41 42 766 | 2/1993 | Germany . |
| 2 239 024 | 6/1991 | United Kingdom . |

OTHER PUBLICATIONS

Patent Abstracts of Japan, vol. 17, No. 391 (C–1087), Jul. 22, 1993, JP–A–05–070707, Mar. 23, 1993.

*Primary Examiner*—Margaret Einsmann
*Attorney, Agent, or Firm*—Oblon, Spivak, McClelland, Maier & Neustadt, P.C.

[57] ABSTRACT

Reactive dye mixtures comprising the dyes of the formulae

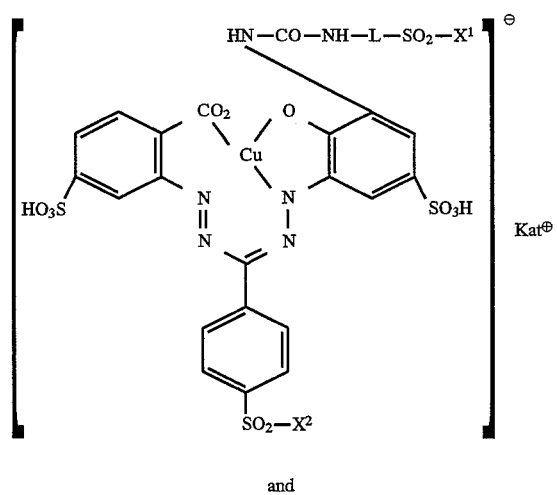

and

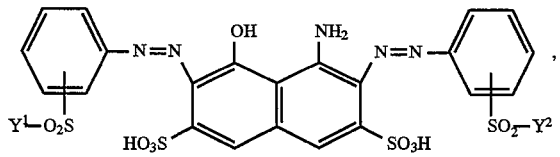

where $Kat^{\oplus}$ is a cation, L is $C_2$–$C_4$-alkylene, and $X^1$, $X^2$, $Y^1$ and $Y^2$ are each vinyl or a radical of the formula $C_2H_4$-Q, where Q is a group detachable under alkaline reaction conditions, in a weight ratio of from 20:80 to 90:10, are useful for dyeing or printing hydroxyl-containing or nitrogenous organic substrates.

7 Claims, No Drawings

MIXTURES OF REACTIVE DYES FOR NAVY SHADES

The present invention relates to novel mixtures of reactive dyes, comprising the dyes of the formulae I and II

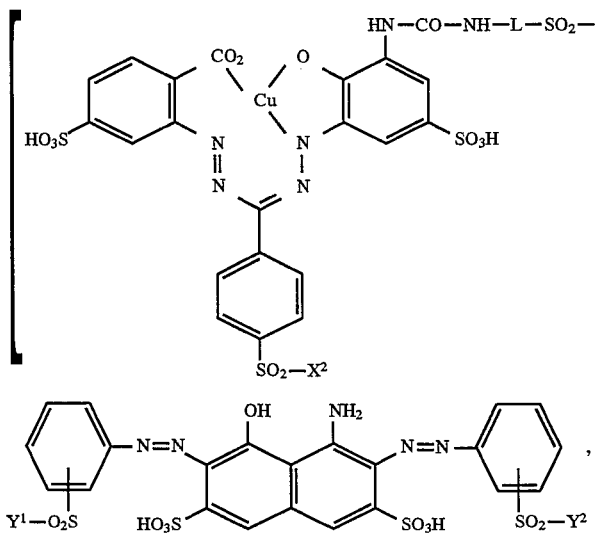

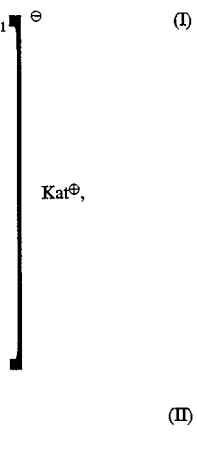

where $Kat^\oplus$ is the equivalent of a cation, L is $C_2$–$C_4$-alkylene, and $X^1$, $X^2$, $Y^1$ and $Y^2$ are each independently of the others vinyl or a radical of the formula $C_2H_4$-Q, where Q is a group detachable under alkaline reaction conditions, in a weight ratio of from 20:80 to 90:10, and to the use thereof for dyeing or printing hydroxyl-containing or nitrogenous organic substrates.

The commercially available reactive dyes for navy dyeings frequently have various disadvantages. For instance, disazo dyes with 1-amino-8-hydroxynaphthalene-3,6-disulfonic acid as coupling component have only limited lightfastness or washfastness, depending on the reactive hook. Reactive dyes based on 1:1 copper complex azo dyes, in turn, frequently lack color strength or peroxide stability. Copper formazan dyes typically produce bright medium blue shades which do not build up to navy.

It is an object of the present invention to provide novel mixtures of reactive dyes which in use produce navy shades and whose dyeings and prints have good application properties, especially high lightfastness and high washfastness.

We have found that this object is achieved by the above-defined mixtures of the reactive dyes of the formulae I and II.

The reactive dyes of the formulae I and II are each indicated in the form of the free acid. It will be appreciated that their salts are also encompassed by the claims. Examples of suitable cations are the metal or ammonium ions mentioned hereinafter under the definition of $Kat^\oplus$.

$Kat^\oplus$ in the formula I is the equivalent of a cation. It is either a proton or derived from metal or ammonium ions. Metal ions include in particular the lithium, sodium or potassium ions. Ammonium ions for the purposes of the present invention are substituted or unsubstituted ammonium cations. Examples of substituted ammonium cations are monoalkyl-, dialkyl-, trialkyl-, tetraalkyl- or benzylerialkyl-ammonium cations or cations derived from nitrogenous five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl is generally to be understood as meaning straight-chain or branched $C_1$–$C_{20}$-alkyl which may be substituted by hydroxyl groups and/or may be interrupted by from 1 to 4 oxygen atoms in ether function.

Special emphasis as cations is given to protons or lithium, sodium or potassium ions, and the metal cations mentioned are also preferred cations when the reactive dyes I and II are present in salt form.

The radical Q is a group detachable under alkaline reaction conditions. Examples of such groups are chlorine, bromine, $C_1$–$C_4$-alkylsulfonyl, phenylsulfonyl, $OSO_3H$, $SSO_3$, $OP(O)(OH)_2$, $C_1$–$C_4$-alkylsulfonyloxy, phenylsulfonyloxy, $C_1$–$C_4$-alkanoyloxy, $C_1$–$C_4$-dialkylamino or a radical of the formula

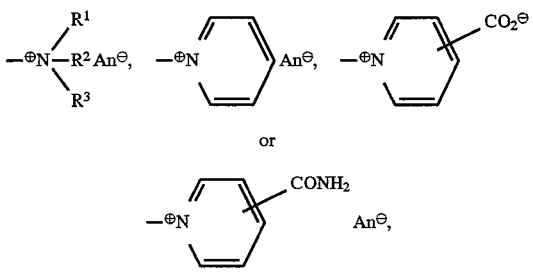

where $R^1$, $R^2$ and $R^3$ are identical or different and each is independently of the others $C_1$–$C_4$-alkyl or benzyl, and $An^\oplus$ is in each case an equivalent of an anion. Examples of suitable anions are fluoride, chloride, bromide, iodide, mono-, di- or trichloroacetate, methylsulfonate, phenylsulfonate and 2- or 4-methylphenylsulfonate.

L is for example $(CH_2)_2$, $(CH_2)_3$, $(CH_2)_4$, $CH(CH_3)CH_2$ or $CH(CH_3)CH(CH_3)$.

Preference is given to dye mixtures comprising the reactive dye of the formula IIa

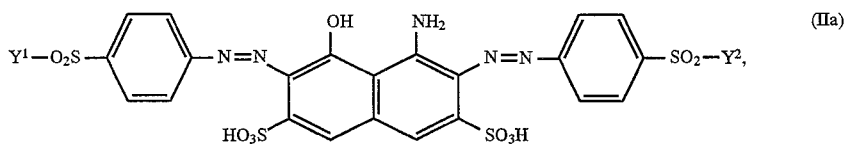

where $Y^1$ and $Y^2$ are each as defined above.

Preference is further given to dye mixtures comprising the dye of the formula I where L is $C_2$-alkylene.

Preference is further given to dye mixtures comprising the dyes of the formulae I and II where $X^1$, $Y^1$ and $Y^2$ are each 2-sulfatoethyl and $X^2$ is 2-chloroethyl.

Particular preference is given to reactive dye mixtures comprising the dyes of the formulae Ia and IIb

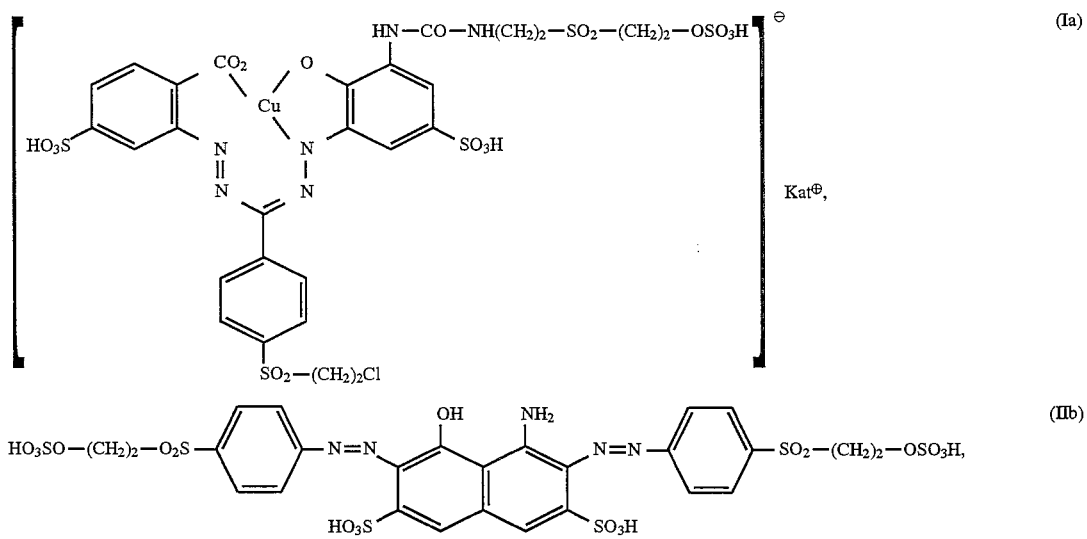

where $Kat^\oplus$ is as defined above.

Preference is also given to dye mixtures comprising the dyes of the formulae I and II in a weight ratio of from 30:70 to 70:30. Particular preference is further given to dye mixtures comprising the dyes of the formulae I and II in a weight ratio of from 40:60 to 60:40.

The dyes of the formulae I and II are known products. Dyes of the formula I are known for example from EP-A-592 980. The dye of the formula IIb is for example C.I. Reactive Black 5 (20505).

The dye mixtures of the present invention are prepared in a conventional manner, for example by mixing the respective partners in the stated weight ratio. If desired, the novel mixtures may include further components, for example assistants such as standardizing agents, dispersants or dustproofing agents, or further dyes, for example for shading. It is also possible to blend finished dye preparations of the respective partners or finished dye preparations with pure dyes.

The novel dye mixtures are advantageously useful for dyeing or printing hydroxyl-containing or nitrogenous organic substrates. Examples of such substrates are leather and fiber material which predominantly contains natural or synthetic polyamides or natural or regenerated cellulose. The novel dyes are preferably useful for dyeing and printing textile material based on wool or in particular cotton. The dyeings and prints obtained have navy shades.

Strong dyeings having good in-use/service fastness properties, in particular high lightfastness and good washfastness, are obtained on cellulose-based substrates, in particular.

The Examples which follow illustrate the invention.

The following dyes were used:

Dye 1:

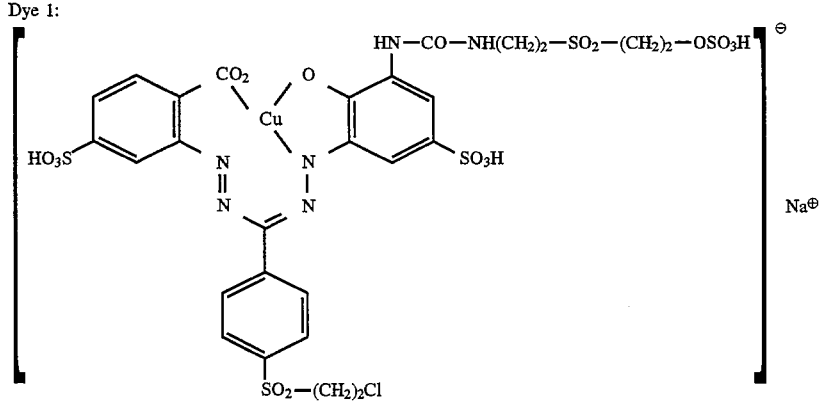

Dye 2:

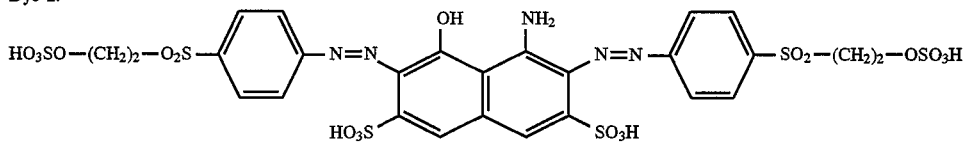

EXAMPLE 1

100 g of a cotton yarn were dyed in a bath containing 1000 ml of water, 12 g of a mixture of 6.5 g of dye 1 and 5.5 g of dye 2, 5 g of sodium carbonate, 1 g of 32% strength by weight sodium hydroxide solution and 60 g of sodium sulfate decahydrate. The dyeing was started at 30° C., the temperature was raised to 50° C. over 30 minutes, and dyeing was continued at 50° C. for a further 60 minutes. After cooling down, the yarn was rinsed and soaped off at the boil. The dyeing obtained had a deep navy shade with very good lightfastness and washfastness properties.

EXAMPLE 2

Woven cotton fabric was impregnated on a pad-mangle at room temperature with a dyeing liquor which, per 1000 g of liquor, contained 60 g of a dye mixture of 24 g of dye 1, 36 g of dye 2, 50 g of sodium silicate (38° Bé) and 30 g of 32% strength by weight sodium hydroxide solution. After impregnating with a 70% wet pickup, the fabric was rolled up, wrapped in a plastic film, and stored in the moist state at room temperature for 8 hours. Thereafter the fabric was rinsed and soaped off at the boil. The dyeing obtained had a deep navy shade and excellent fastness properties.

We claim:

1. Mixtures of reactive dyes, comprising the dyes of the formulae I and II

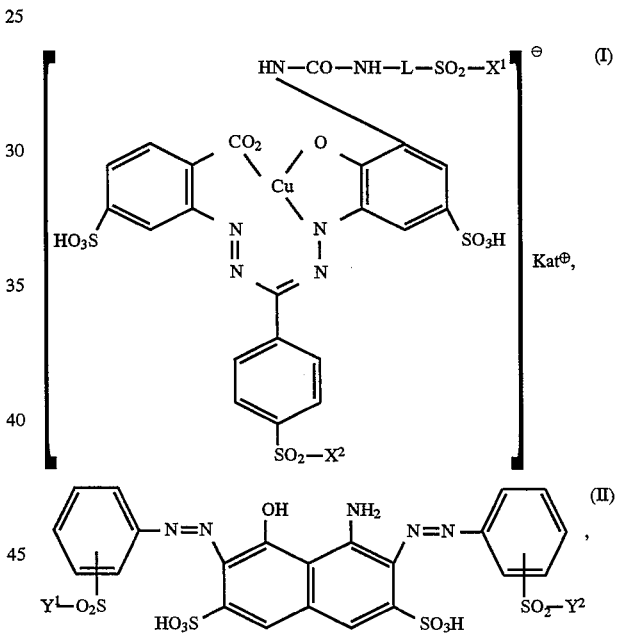

where Kat$^\oplus$ is the equivalent of a cation, L is $C_2$-$C_4$-alkylene, and $X^1$, $X^2$, $Y^1$ and $Y^2$ are each independently of the others vinyl or a radical of the formula $C_2H_4$-Q, where Q is a group detachable under alkaline reaction conditions, in a weight ratio of from 20:80 to 90:10.

2. Dye mixtures as claimed in claim 1, wherein the dye of formula (II) comprises the reactive dye of the formula IIa

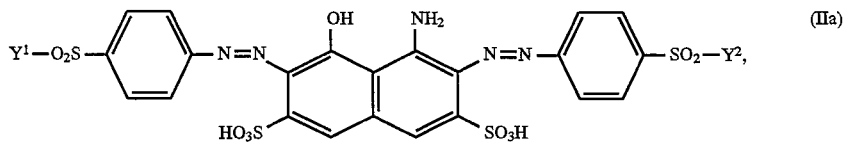

where $Y^1$ and $Y^2$ are each as defined in claim 1.

3. Dye mixtures as claimed in claim 1, wherein L is $C_2$-alkylene.

4. Dye mixtures as claimed in claim 1, wherein $X^1$, $Y^1$ and $Y^2$ are each 2-sulfatoethyl and $X^2$ is 2-chloroethyl.

5. Dye mixtures as claimed in claim 1, comprising the dyes of the formulae I and II in a weight ratio of from 30:70 to 70:30.

6. Dye mixtures as claimed in claim 1, comprising the dyes of the formulae I and II in a weight ratio of from 40:60 to 60:40.

7. A method of which comprises applying the dye mixture of claim 1 to dyeing or printing hydroxyl-containing or nitrogenous organic substrates.